April 8, 1958 R. A. McCALLUM 2,829,763
CUTTINGS DISCHARGE DEVICES
Filed Dec. 11, 1953 3 Sheets-Sheet 1

INVENTOR
ROBERT A. McCALLUM
BY Murray A. Gleeson
ATTORNEY

April 8, 1958 R. A. McCALLUM 2,829,763
CUTTINGS DISCHARGE DEVICES
Filed Dec. 11, 1953 3 Sheets-Sheet 3

INVENTOR
ROBERT A. McCALLUM
BY *Murray G. Gleeson*
ATTORNEY

United States Patent Office 2,829,763
Patented Apr. 8, 1958

2,829,763

CUTTINGS DISCHARGE DEVICES

Robert A. McCallum, Clarendon Hills, Ill., assignor to Goodman Manufacturing Company, Chicago, Ill., a corporation of Illinois Application December 11, 1953, Serial No. 397,632

4 Claims. (Cl. 198—213)

This invention relates to a cuttings discharge device for a kerf cutting machine or the like, and to an improved form characterized by requiring greatly less power in its operation.

In certain types of cutting machines having an endless cutter chain movable orbitally on a cutter bar it has been the practice to employ a suitable cuttings discharge device for the cuttings made by the cutter chain. Such discharge devices have sometimes consisted of a screw discharging the cuttings into a windrow to the rear and to the side of the machine as it advances in making a cut, be it a shortwall type of machine or a universal type of cutter for making roof and shear cuts as well as for cutting kerfs.

I have found that the power consumption for such a screw type conveyor can be cut drastically particularly when the discharge end of the conveyor is buried in a windrow of cuttings, as in case of cutting a kerf with a shortwall machine or making a bottom cut with a universal cutter.

I have found that by extending the screw conveyor beyond its guide tube, I can decrease the power required for conveying the cuttings by as much as 50%.

In the case where the cuttings discharge device of a universally mounted cutter is driven by a fluid motor this is especially important as such discharge devices ordinarily cannot be driven by a power takeoff from the motor driving the cutter chain.

With the foregoing considerations in mind it is a principal object of this invention to provide a new and improved cuttings conveyor for a cutting machine for coal or the like, which cuttings conveyor is characterized by requiring a much less power for operation than the conveyors of the prior art.

Other objects and important features of the invention will be apparent from a study of the following specification taken with the drawings which together show a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, nor otherwise than by the terms of the claims subjoined.

Figure 1:
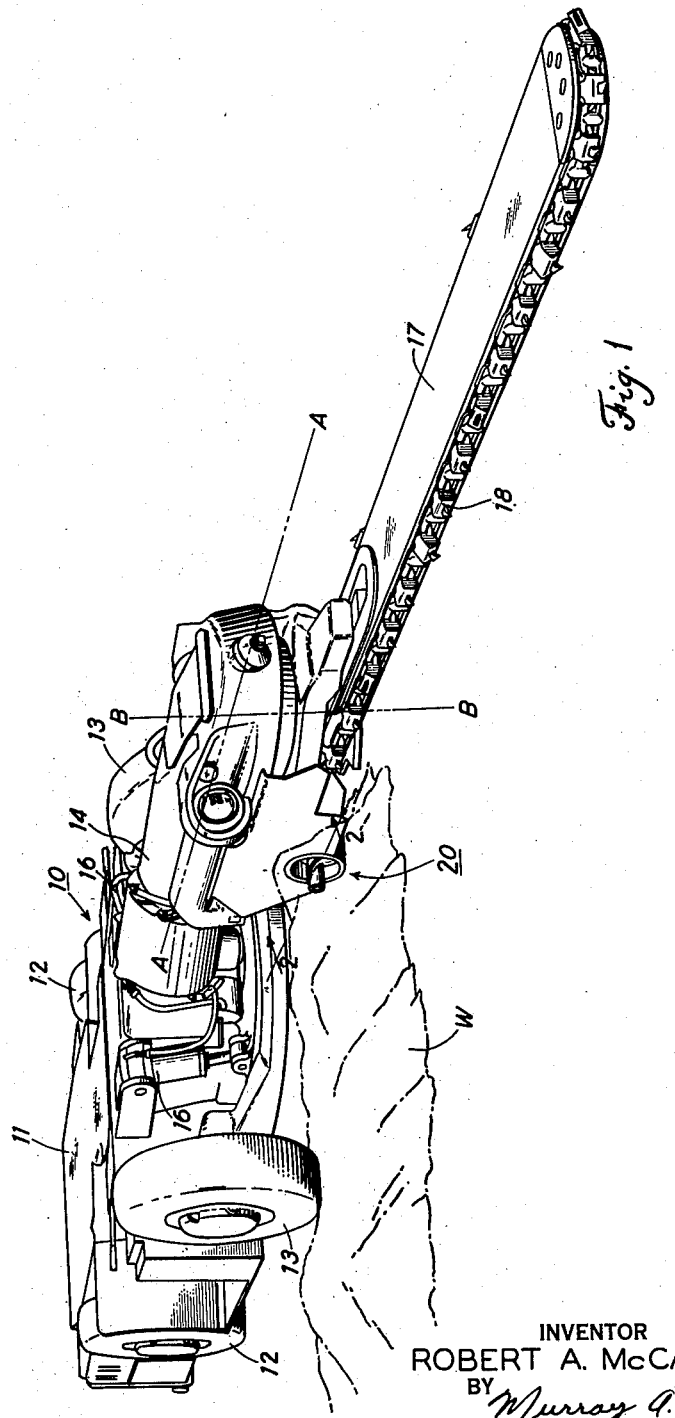
Fig. 1 is a perspective view of a universally mounted cutting machine having the improved cuttings discharge device according to the present invention embodied therein.

Referring now particularly to Fig. 1 of the drawings, the present invention may be embodied in a universally mounted cutting machine indicated generally by the reference numeral 10. Said machine consists of a frame 11 mounted to tram upon wheels 12 and 13. Wheels 12 may be supplied by power from a remote source as by means of a cable, not shown, and wheels 13 may be steered, so that the machine 10 can be spotted as desired within a mine.

The forward end of the machine shown in Fig. 1 includes a turret 14 which can be rotated as desired about an axis A—A, and which may be raised and lowered in a vertical plane by means of lifting cylinders 16, 16. The turret 14 affords a support for a cutter bar 17 which provides a guide for an endless cutter chain 18, the cutter bar 17 being arranged to swing on an axis B—B with respect to turret 14.

Such a machine may be employed for cutting a kerf at the bottom of a seam of coal or the like, and may also be employed to making band cuts or vertical shear cuts as desired. While the invention is described in connection with such a universal type of machine, it may also be used in connection with a short wall type of machine.

In cutting a bottom kerf the action of the cutter chain 18 traveling in an orbital path on the cutter bar 17 is such as to create a mass of extremely fine cuttings which are conveyed away from the chain 18 at the drive end thereof within the turret 14 by means of a cuttings discharge device referred to generally by the reference numeral 20. In cutting such a bottom kerf the cuttings discharge device 20 will discharge the fine cuttings into a windrow W, and as the machine advances with respect to the working face the amount of cuttings from the discharge device will generally be sufficient in quantity so that the cuttings discharge device is constantly discharging while being covered by the windrow W.

In a universal type of cutting machine such as has just been described, it is not generally possible to drive the cuttings discharge device from the same drive mechanism which drives the cutter chain, and in order to make the cuttings discharge device universal in its action with the cutter bar 17 it has been the practice to operate the cuttings discharge device by means of a hydraulic motor. The limitations in size imposed upon such a hydraulic drive motor obviously limits the amount of power which can be consumed by the cuttings discharge device.

I have further found that when the discharge device 20 is discharging into the windrow W during a bottom kerf cutting operation, the power required to discharge into such windrow may be sufficient to stall the hydraulic motor driving the discharge conveyor. Accordingly, the screw conveyor of such a cutting discharge device has been, according to my invention, so devised that the power required under the condition described may be reduced by as much as 50%.

Figure 2:
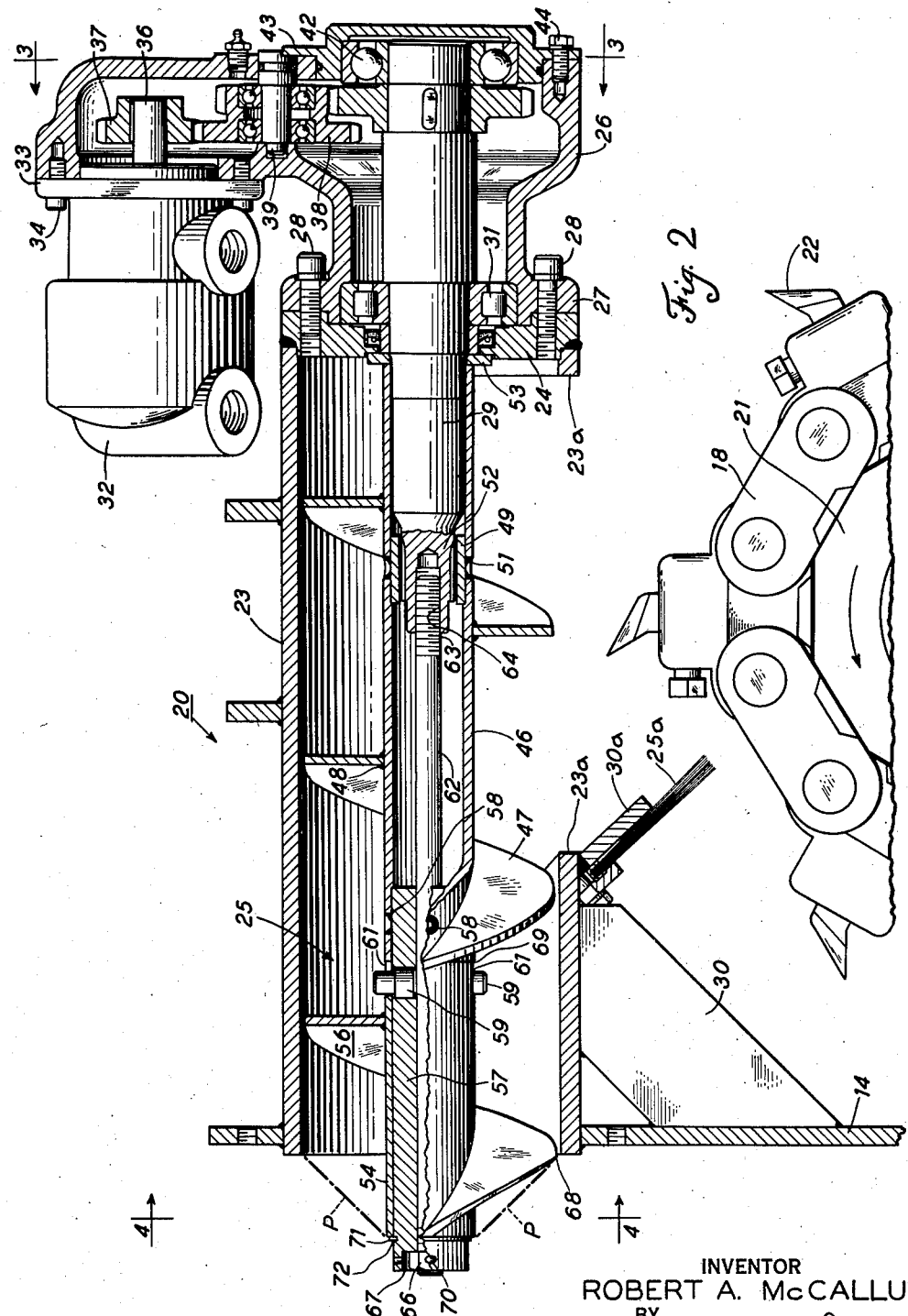
Fig. 2 is a longitudinal sectional view of the improved cuttings discharge devices of the present invention, said view being taken along the plane 2—2 of Fig. 1, the position of the cuttings discharge device being shown with respect to the cutter chain of the machine shown in Fig. 1, certain parts being shown in plan view.
Figure 3:
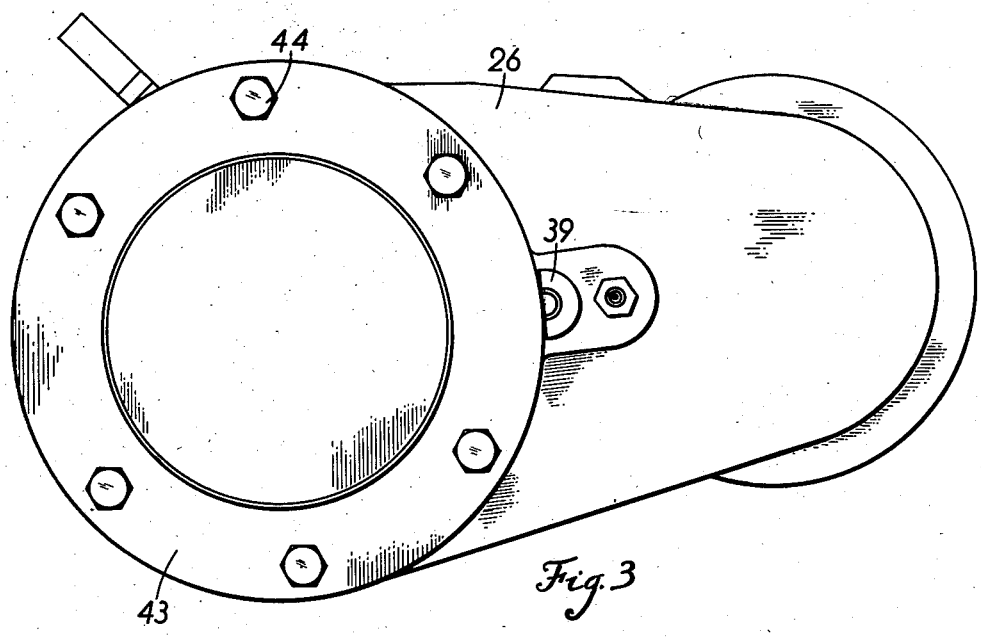
Fig. 3 is an end view of the cuttings discharge device shown in Fig. 2, said view being taken along the line 3—3 of Fig. 2 and looking in the direction of the arrows.
Figure 4:
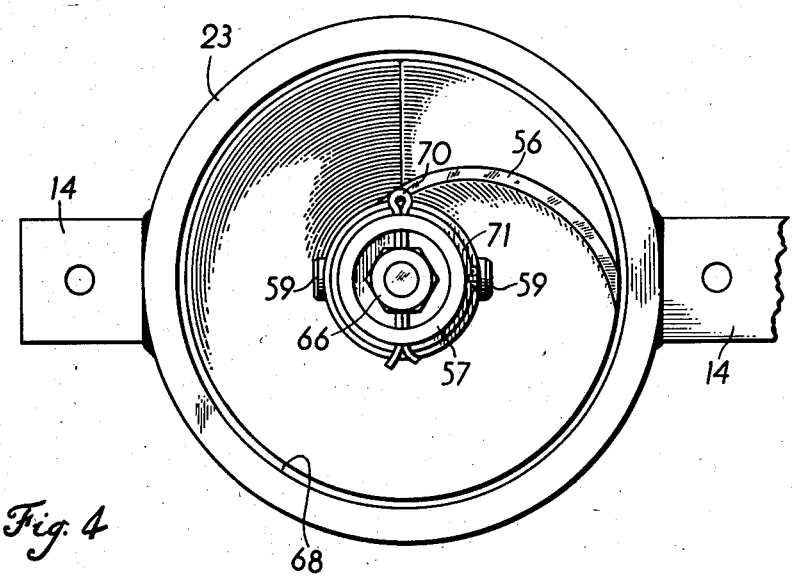
Fig. 4 is an end view of the discharge end of the improved cuttings discharge device of the present invention, said view being taken along the line 4—4 of Fig. 2 and looking in the direction of the arrows.

Referring now to Fig. 2 of the drawings, the cutter chain 18 is driven by means of a sprocket 21 driven from a motor, not shown, supported in the frame 11 of the machine 10. As the sprocket 21 turns in a counterclockwise direction as seen in Fig. 2, cutter bits 22 carried by the chain 18 carry the cuttings toward the cuttings discharge device 20. A deflector brush 25a made of stainless steel wire tends to hold back cuttings carried by the cutter bits 22 so that they may be picked up by the cuttings discharge device 20. The brush 25a is mounted on a flange member 30a carried by a support tube 23. A strut member 30 reinforces the support tube. The cuttings carried by the cutter bits 22 are diverted to a longitudinal opening 23a formed in the tube 23 to be conveyed along the length of the tube as will now be described.

The cuttings discharge device 20 consists of the supporting cylindrical tube 23 for a screw type conveyor referred to generally by the reference numeral 25. The support 23 has welded thereto an end wall 24. A housing 26 has a flange 27 whereby it is secured to the end wall 24 by means of socket head screws 28. A drive shaft 29 for the screw conveyor 25 extends within the support tube 23 and is arranged to turn on a roller bearing 31 held within the flange 27 of the housing 26.

Power for turning the shaft 29 is derived from a fluid motor 32 having a mounting flange 33 so that it may be secured by means of socket head screws 34 to the housing 26. The driving motor 32 includes a driving shaft 36 having a drive pinion 37 mounted fast thereon. A cluster gear 38 mounted idly upon a shaft 39 transmits power from the driving pinion 37 to a driven gear 41 mounted fast upon the shaft 29 within the housing 26. As seen in Fig. 2, the shaft 29 is also supported upon a bearing 42 held in an end cap 43 held by cap screws 44 to the housing 26.

The screw conveyor 25 consists of a central tubular shaft 46 driven from the shaft 29 nesting therewithin. A helical vane 47 is welded along its inner periphery as at 48 to the tubular shaft 46. A splined connector 49 for holding the tubular shaft 46 for rotation with the shaft 29 is held by welds 51 to the interior of the tube 46. Said splined connector has a mating spline connection with a splined end 52 of the shaft 29. As seen in Fig. 2 the tube 46 bears against a flange 53 at the interior end thereof which in turn bears against the end closure 24.

The screw conveyor 25 has a wear resistant discharge end consisting of a hollow tube 54 also having welded thereto a helical vane 56 which is continuous with the helical vane 47. The helix 56 may be made of any wear resistant metal such as "stellite" for example. The end piece is supported upon a sleeve-like arbor or coupling 57 which is welded at its end to the end of the sleeve 46 by means of welds 58, 58. The arbor 57 is provided with a pair of diametrically opposed aligning pins 59, and the tube 54 has a pair of slots 61 which serve with the pins 59 properly to align the helix 56.

The two parts of the screw conveyor 25 are held together by means of a long cap screw 62 which is threaded at 63 to be received within a tapped end 64 of the shaft 29. The head 66 of the cap screw 62 is counter sunk as at 67 within the end of the sleeve 57 extending beyond the discharge end of the cuttings conveyor 20. Both the end of the sleeve 57 and the head 66 of the cap screw 62 may be drilled to receive a cotter pin 70.

In order to retain the tube 54 upon the arbor 57 against endwise movement, the arbor 57 is provided with a recess 72 retaining a snap ring 71 bearing against the end of the tube 54. The snap ring 71 thus causes the tube 54 to abut the tube 46 as at 69.

The helix 56 of the screw conveyor has the same pitch as the helix 47, but it is tapered from a point 68 where it emerges from the tube 23 so that it describes in rotation a path P. Such a configuration makes it virtually impossible for the helix to cause injury to the operator who may accidentally place his foot next to the discharge end of the conveyor 20.

While the protruding portion of the helix 56 may be so configured as to described in rotation a frustro-conical path, it may describe a cylindrical path by appropriate shaping of the protuberant portion of the helix. It is important, however, for minimizing the power requirements to limit the amount of such extension to not more than one-half the internal diameter of the tube 23.

It will be noted that the entire screw conveyor assembly is supported as a cantilever upon the bearings 31 and 42, thereby making it unnecessary to support the discharge end of the screw conveyor upon an outboard bearing which would impede the discharge of the cuttings.

The provision of the extension of the screw conveyor beyond the discharge opening 68 of the tube 23, particularly in those cases where the screw conveyor is discharging into a windrow W, as seen in Fig. 1, makes it possible to reduce greatly the amount of power necessary to drive the conveyor screw. The provision of such extension appears to agitate the material in the windrow W sufficiently to prevent packing of the cuttings adjacent the discharge opening 68, and in tests performed upon a construction according to the present invention, it has been found that the power consumption may be reduced by as much as 50% compared to constructions where the helix terminates at a point inside the tube 23 and behind the discharge opening 68.

While the invention has been described in terms of a preferred embodiment thereof its scope is not intended to be limited by the described embodiment, nor otherwise than by the terms of the claims here appended.

I claim as my invention:

1. A cuttings discharge device for kerf cutting machines or the like where such cuttings are discharged as an unconfined windrow, which comprises an elongated casing having a screw conveyor element rotatably mounted therein, said screw conveyor extending for the length of said casing and beyond the discharge end thereof so that said screw conveyor extends into the material discharged from said casing from the discharge end thereof, the portion of said screw conveyor extending beyond the discharge end being so formed so as to describe a cone in its rotation, the portion of the screw conveyor extending into said material operating to agitate the material and to prevent packing of same around the discharge end, the discharged material being otherwise unconfined, said extending portion being no longer than one-half of the internal diameter of said casing.

2. A cuttings discharge device for kerf cutting machines or the like where such cuttings are discharged as an unconfined windrow which comprises an elongated casing having a screw conveyor element rotatably mounted therein, said screw conveyor being characterized by being supported for rotation at its cuttings receiving end only so as to be free from support at its discharge end to prevent any impeding of the flow of cuttings thereby, said screw conveyor extending for the length of said casing and beyond the discharge end thereof so that said screw conveyor extends into the material discharged from said casing from the discharge end thereof, the end of the screw conveyor extending into said material operating to agitate the material and to prevent packing of same around the discharge end, the discharged material being otherwise unconfined, said extending portion being no longer than one-half of the internal diameter of said elongated casing.

3. A cuttings discharge device for kerf cutting machines or the like where such cuttings are discharged as an unconfined windrow, which comprises an elongated casing having a screw conveyor element rotatably mounted therein, at least one bearing for said screw conveyor mounted near the cuttings receiving end thereof and supporting said screw conveyor substantially as a cantilever, said screw conveyor extending for the length of said casing and beyond the discharge end thereof so that said screw conveyor extends into the material discharged from said casing from the discharge end thereof, the end of the screw conveyor element extending into said material operating to agitate the material and to prevent packing of same around the discharge end, the discharged material being otherwise unconfined, the portion of said screw conveyor protruding from said elongated casing extending a distance into said windrow no greater than one-half the internal diameter of said elongated casing.

4. A cuttings discharge device for kerf cutting machines or the like where such cuttings are discharged as an unconfined windrow, which comprises an elongated casing having a screw conveyor element rotatably mounted therein, said screw conveyor extending for the length of said casing and beyond the discharge end thereof so that said screw conveyor extends into the material discharged from said casing from the discharge end thereof, the end of the screw conveyor extending into said material operating to agitate the material and to prevent packing of same around the discharge end, the discharged material being otherwise unconfined, the portion of said screw conveyor protruding from said elongated casing extending a distance no greater than one-half the internal diameter of said elongated casing.

References Cited in the file of this patent

UNITED STATES PATENTS

| | | |
|---|---|---|
| 1,735,920 | Fitzhugh | Nov. 19, 1929 |
| 1,767,248 | Leach | June 24, 1930 |
| 2,250,181 | Crocker | July 22, 1941 |
| 2,352,795 | McCullough | July 4, 1944 |
| 2,443,942 | Winkler et al. | June 22, 1948 |